United States Patent [19]

Lewis

[11] 4,267,858
[45] May 19, 1981

[54] PRESSURE RELIEF VALVE

[75] Inventor: Oliver G. Lewis, Mountainside, N.J.

[73] Assignee: Exxon Research & Engineering Co., Florham Park, N.J.

[21] Appl. No.: 138,552

[22] Filed: Apr. 8, 1980

[51] Int. Cl.³ ............................................. F16K 15/00
[52] U.S. Cl. ..................................... 137/529; 137/327; 137/467; 137/538; 220/203; 220/206
[58] Field of Search ............... 137/327, 467, 529, 538; 220/203, 206

[56] References Cited

U.S. PATENT DOCUMENTS

| | | | |
|---|---|---|---|
| 2,644,480 | 7/1953 | Earle | 137/529 X |
| 2,653,729 | 9/1953 | Richter | 137/467 X |
| 3,263,698 | 8/1966 | Siggelin | 137/467 |
| 3,578,006 | 5/1971 | Betz | 137/467 X |
| 4,015,627 | 4/1977 | Bower | 137/467 X |

Primary Examiner—Harold W. Weakley
Attorney, Agent, or Firm—Robert S. Salzman

[57] ABSTRACT

A pressure relief mechanism seated within a wall of a pressure vessel features a novel flexible seal. The vessel pressure acts against both a spring and an internal valve pressure created by the flexible seal. The pressure relief mechanism can be designed to release over a wide range of critical vessel pressures due to the combination of the resistive spring force and the resistive internal pressure.

16 Claims, 6 Drawing Figures

PRESSURE RELIEF VALVE

FIELD OF THE INVENTION

This invention relates to pressure relief valves designed to release when a critical vessel pressure is achieved, and more particularly to a pressure relief mechanism having a novel internal seal.

BACKGROUND OF THE INVENTION

Most pressure relief valves feature a piston acting against a spring in response to the pressure in a tank or vessel in which they are located. When the pressure in the vessel reaches a critical value, the piston is designed to push against the spring and release a detent. This allows the valve to break its pressure seal with the tank causing the pressure therein to be relieved.

One of the drawbacks of these relief valves is that they usually cannot be used at very low tank pressures of about 2.5 psig or less. At these very low pressures, the valve cannot provide enough force at its sealing interface with the tank to maintain a bubble-tight or leak-proof seal. The leakage about the seal interface becomes especially acute as the critical pressure is approached.

At very low pressures, friction will also have more of an influencing effect upon the reproducibility and accuracy of the valve release.

For low pressure relief, it is, therefore, not uncommon to use valves having metallic or carbon rupture discs. These valves, however, cannot be reused after disc rupture, and are also generally of a larger diameter size.

This invention seeks to provide a pressure relief valve which can be used over a wider critical pressure range; is adjustable to release at different pressures; and can be used at very low critical pressures of about 2.5 psig or less.

DISCUSSION OF THE PRIOR ART

It has been suggested that a relief valve can be designed with a coil spring and a nonrupturable diaphragm. Increasing vessel pressure will cause the diaphragm of the valve to expand and pull a release shaft biased against movement by the coil spring. Such a valve device is shown in the U.S. Patent to: Allen M. Bower, entitled: "PRESSURE RELIEF VALVE"; Pat. No. 4,015,627; issued: Apr. 5, 1977. While a nonrupturable flexible diaphragm is utilized in this relief valve, it is caused to expand with pressure and pull against the spring. The flexible diaphragm therefore actuates the movement of the release shaft.

This invention, on the other hand, has a bellows which contracts with pressure and has a compressive spring force which acts with the coil spring to compressively bias against the movement of a release piston.

SUMMARY OF THE INVENTION

This invention pertains to a relief pressure mechanism which is seated within a wall of a pressurized vessel. The relief pressure mechanism comprises a valve body having an inner bore and at least two detent apertures opening into the bore. The two detents seated in the apertures of the valve body normally extend into, and engage with, a recessed portion in the wall of the pressurized vessel. This prevents the valve body from relieving the pressure in the vessel by disengaging from the vessel.

A piston is disposed in the bore of the valve body and normally engages with, and holds, the detents in their extended position with respect to the recessed portion of the vessel wall. The piston is movable past the detent apertures under the influence of a predetermined vessel pressure for disengaging said detents from said recess portion.

A spring biasing means is disposed in the bore of the valve body for compressively biasing the piston towards engagement with the detent.

A flexible bellows exerting a compressive spring force towards the movement of said piston is disposed between the valve body and the piston for establishing a seal between the piston and the valve body. When the piston is caused to move under the influence of the vessel pressure, it will be urged against such movement by both the compressive spring biasing means and the compressive spring force exerted by the bellows.

In another embodiment, the bellows may be replaced by a rolling diaphragm such that only the coil spring will provide a compressive spring force against the piston movement.

It is an object of this invention to provide an improved pressure relief mechanism;

It is another object of the invention to provide a pressure relief mechanism that is operable over a wider critical pressure range, and which can operate at very low pressures.

These and other objects of the invention will be better understood and will become more apparent with reference to the following detailed description taken in conjunction with the accompanying drawings.

DETAILED DESCRIPTION OF THE INVENTION

Figure 1:
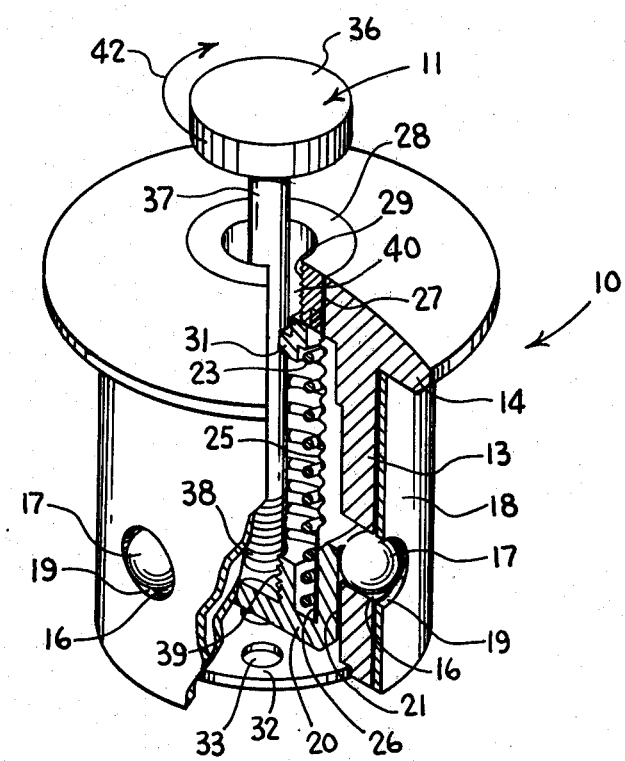
FIG. 1 illustrates a perspective cutaway view of the invention pressure relief device with a mounting tool inserted therein. The pressure relief retention device is shown in its extended position.
Figure 2:
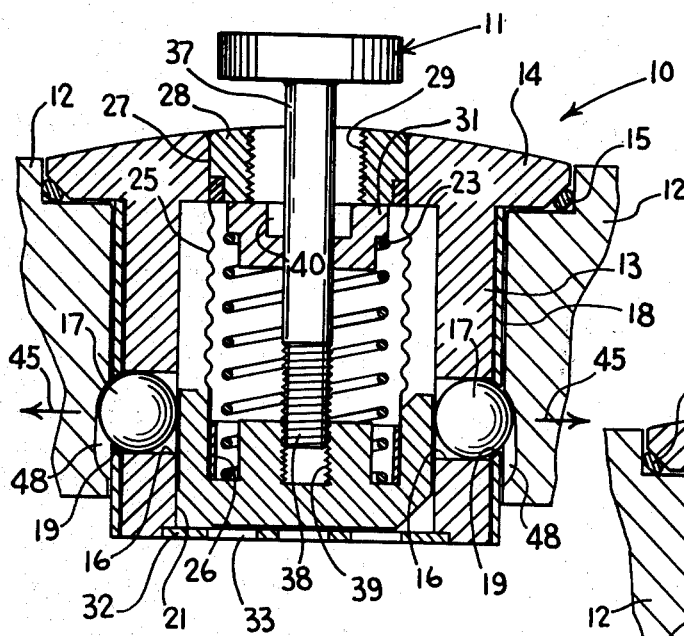
FIG. 2 depicts a cross-sectional view of the inventive pressure relief device of FIG. 1, with the device shown in its locked position within a pressure vessel.

Referring now to FIGS. 1 and 2, the pressure relief mechanism 10 of this invention is shown with a mounting tool 11 inserted therein, for moving the piston to allow retraction of the detents prior to mounting the pressure relief mechanism 10 into the wall 12 of a pressure vessel.

The pressure relief mechanism 10 comprises a central housing 13 having a flanged portion 14 which forms a seal with the vessel wall 12 via an O-ring 15.

The housing 13 has a plurality of apertures 16 (generally three or four) each disposed about its circumference and which each contains a detent ball 17 as shown. A jacket 18 having smaller holes 19 surrounding apertures 16 of the housing 13, limits the outer movement of the balls 17 within aperture 16.

The relief device 10 also comprises a movable piston 20, which slidably moves within an inner bore 21 of housing 13. The upward movement (arrow 22 of FIG. 4) of the piston 20 within bore 21 is resisted by coil spring 23, and by a spring force created by a flexible seal in the form of a bellows 25 (FIGS. 1-4).

The bellows 25 shown in FIGS. 1-4, is sealed to the piston 20 at its lower end 26, and is sealed to the housing 13 at its upper end 27, thus creating a flexible pressure seal between the piston 20 and housing 13.

Figure 3:
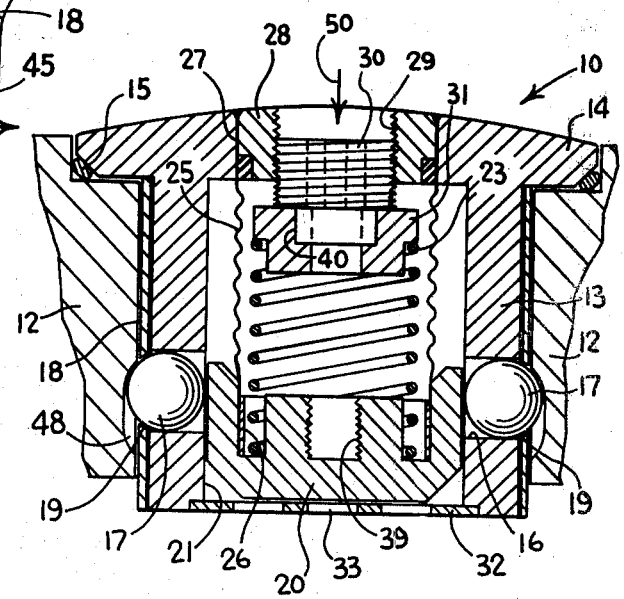
FIG. 3 shows a cross-sectional view of the inventive pressure relief device of FIG. 1, with the device being adjusted to a given critical release pressure.

A closure plug 28 is disposed in the top of housing 13, and has as an inner threaded bore 29 for receiving an adjustment screw 30 (FIG. 3). The adjustment screw 30 is used to compress the coil spring 23 by bearing against a movable disc 31 which, in turn, bears against spring 23. The screw 30 contains a venting port which may be closed only by a porous filter or screen, maintaining atmospheric pressure within the bellows seal 25 and above the piston 20.

The inserting tool 11 is comprised of a handle 36 having a shank 37 extending therefrom. The lower part of the shank 37 has threads 38 which fit a threaded bore 39 of piston 20.

OPERATION OF THE INVENTION

The pressure relief mechanism 10 of this invention is designed to be inserted into a cylindrical cavity in the outer shell of a pressure vessel defined by walls 12. Prior to insertion, the mechanism 10 is in the position shown in FIG. 1. The tool 11 is placed inside housing 13 and is rotated (arrow 42) to engage piston 20 via threaded bore 39, as shown. The piston 20 is raised to the position shown in FIG. 4 by pulling upward upon the handle 36 of tool 11. In this position, the detent balls 17 are retracted (arrow 55), and the housing 13 is deposited in the cavity defined by walls 12.

The tool 11 is now removed by rotating the handle 36 in an opposite direction to that shown by arrow 42.

The piston 20 is allowed to drop to the position shown in FIG. 2, causing the detent balls 17 to be cammed into recess 48 in walls 12, as shown by arrows 45. Endplate 32 prevents piston 20 from dropping out of bore 21, but allows pressure from the vessel to be exerted on piston 20 via holes 33.

The force of spring 23 is now adjusted by threading the adjustment screw 30 into the threaded bore 29 of the pressure plug 28, as shown by arrow 50 in FIG. 3. The adjustment screw 30 is of the type manufactured by the Mott Metallurgical Corporation, Farmington, Conn.; 1/4-20 screw with sintered metal insert for venting the cavity above the piston 20.

The adjustment screw 30 causes the downward displacement of disc 30 as it is threaded into bore 29. The downward movement of disc 31 causes the spring 23 to compress, thus changing the spring force against which the upward movement of piston 20 is resisted.

The upward displacement of the piston 20, under the influence of the pressure in the pressure vessel, is resisted by both the spring force of the bellows 25 and the spring force of spring 23.

Figure 4:
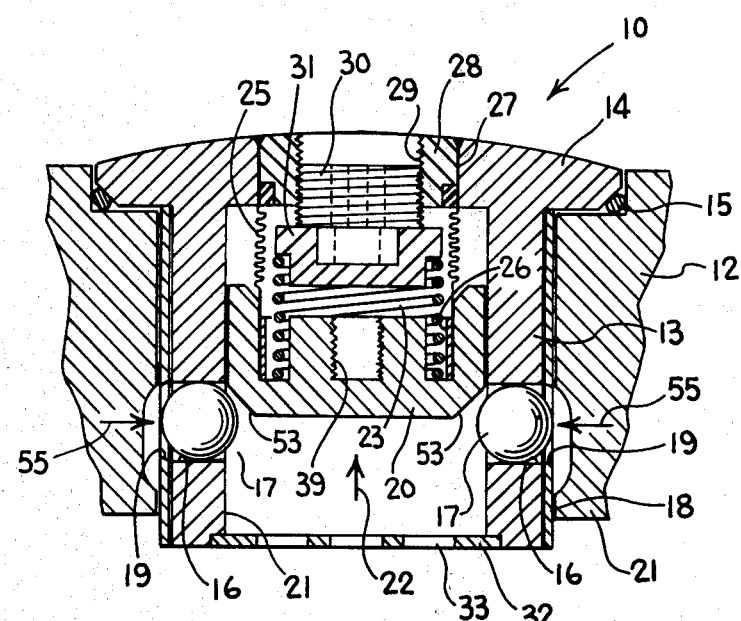
FIG. 4 illustrates a cross-sectional view of the inventive pressure relief device of FIG. 1 with the device shown just prior to the release position.

As the pressure in the pressure vessel increases towards a critical value, the piston 20 is caused to be upwardly displaced, as shown by arrow 22 in FIG. 4. When the critical pressure in the vessel is reached, the chambered bottom edge 53 of the piston will clear the detent balls 17, causing the detent balls 17 to retract from groove 48, as shown by arrows 55. The relief mechanism 10 will now break its seal, and be expunged from the pressure vessel. This will cause the over-pressure in the vessel to be dissipated.

In the design of this relief mechanism 10, it is contemplated that the tool 11 may be made with a special off-sized thread 38 on the bottom of shank 37, such that only authorized personnel can retract the piston and insert this device into the pressure vessel. Also, the insertion of the adjustment screw 30 can also be designed to require the use of a special tool or key, so that only authorized personnel can set the critical relief pressure point. This device 10 can also be made to require insertion and adjustment by standard tools, so that anyone can use the relief device 10. The particular design of the relief device is a matter of engineering choice as befits its intended purpose.

Figure 5:
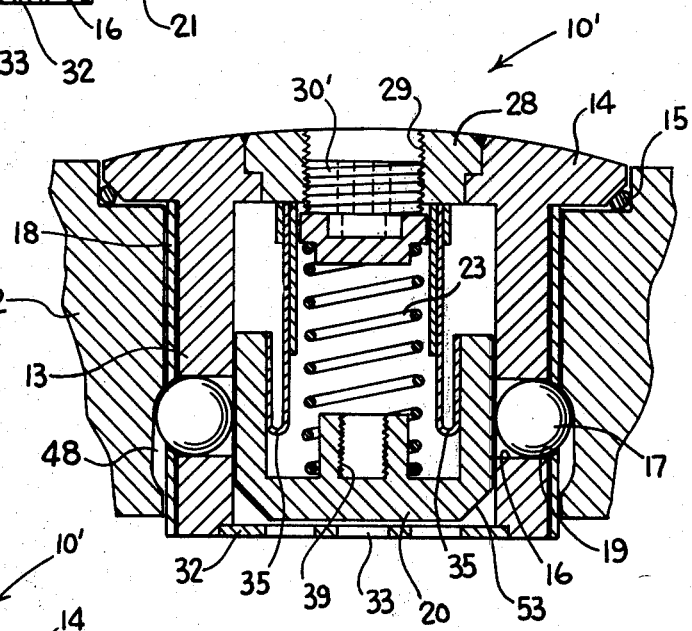
FIG. 5 depicts in a cross-sectional view an alternate embodiment for the pressure relief device of FIG. 1, with the relief device mounted within a pressure vessel.
Figure 6:
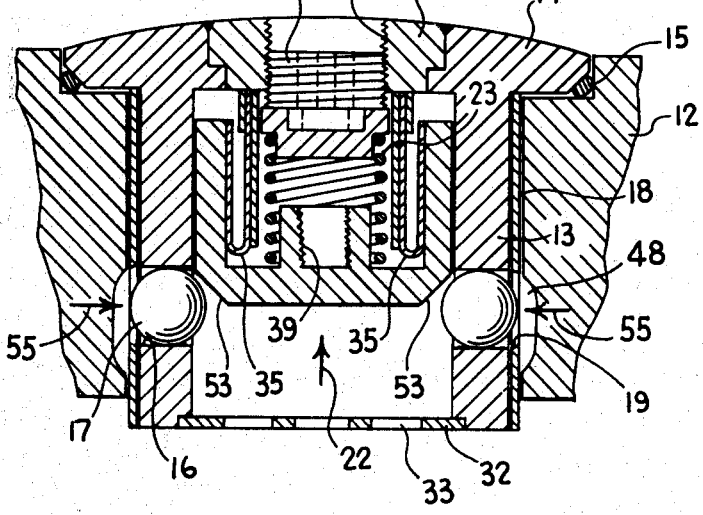
FIG. 6 shows in a cross-sectional view, the pressure relief device of FIG. 5, with the device shown just prior to the release position.

Another embodiment of the relief device 10 is illustrated in FIGS. 5 and 6. For the sake of brevity, like parts and components will have the same numerical designations. The pressure relief mechanism 10' is inserted in the pressure vessel in similar fashion to that shown for device 10 of FIGS. 1-4. The adjustment of the spring force is achieved by a similar adjustment screw 30', which is threaded into the threaded bore 29 of plug 28, as before.

FIG. 5 depicts the device 10' inserted and adjusted within a pressure vessel. The major difference between devices 10 and 10', is that device 10' contains a rolling diaphragm 35 in place of the bellows 25 of device 10. The rolling diaphragm 35 is caused to roll back upon itself as shown in FIG. 6, when piston 20 is forced upward (arrow 22). The detent balls 17 will retract (arrows 55) from groove 48 in wall 12, when the lower edge 53 of piston 20 clears the balls 17, as before.

The bellows 25 of device 10 imparts a slight additional spring force to the force exerted by spring 23 in restraining the movement of piston 20, which is not obtained with the rolling diaphragm 35 of device 10'. Other modifications can be made as befits the skilled practitioner.

What is claimed is:

1. A pressure relief mechanism seated within a wall of a pressurized vessel, comprising:
    a valve body having an inner bore, and at least two detent apertures opening into said bore;
    at least two detents respectively seated within said apertures of said valve body and normally extending into, and engaging with, a recessed portion in said wall of said pressurized vessel to prevent said valve body from relieving the pressure in the vessel by disengaging from said vessel;
    a piston disposed in said bore of said valve body and normally engaging with, and holding, said detents in their extended position with respect to said recessed portion of said vessel wall, said piston being movable past said detent apertures under the influence of a predetermined vessel pressure for disengaging said detents from said recess portion;
    spring biasing means disposed in the bore of said valve body for compressively biasing said piston towards engagement with said detents; and
    a flexible bellows exerting a compressive spring force against movement of the piston is disposed between said valve body and said piston for establishing a seal between said valve body and said piston, whereby when said piston is caused to move under the influence of said vessel pressure it will be urged against such movement by both said spring biasing means and the compressive spring force of said bellows.

2. The pressure relief mechanism of claim 1, wherein said spring biasing means comprises a coil spring.

3. The pressure relief mechanism of claim 1, wherein said detent is substantially spherical.

4. The pressure relief mechanism of claim 1, wherein there are more than two detents substantially evenly spaced about said valve body.

5. The pressure relief mechanism of claim 1, wherein said valve body has adjustment means for adjusting the spring force of said spring biasing means.

6. The pressure relief mechanism of claim 5, wherein said adjustment means includes a set screw and a movable disc disposed within said valve body.

7. The pressure relief mechanism of claim 1, wherein said valve body comprises a stem portion and a flanged lip portion.

8. The pressure relief mechanism of claim 7, further comprising an O-ring disposed between said valve body flange lip portion and said wall of said pressurized vessel for establishing a seal therebetween independent of spring forces and internal pressures.

9. A pressure relief mechanism seated within a wall of a pressurized vessel, comprising:
   a valve body having an inner bore, and at least two detent apertures opening into said bore;
   at least two detents respectively seated within said apertures of said valve body and normally extending into, and engaging with, a recessed portion in said wall of said pressurized vessel to prevent said valve body from relieving the pressure in the vessel by disengaging from said vessel;
   a piston disposed in said bore of said valve body and normally engaging with, and holding, said detents in their extended position with respect to said recessed portion of said vessel wall, said piston being movable past said detent apertures under the influence of a predetermined vessel pressure for disengaging said detents from said recess portion;
   spring biasing means disposed in the bore of said valve body for compressively biasing said piston towards engagement with said detents; and
   a flexible rolling diaphragm disposed between said valve body and said piston for establishing a seal between said valve body and said piston, whereby when said piston is caused to move under the influence of said vessel pressure it will be urged against such movement by said spring biasing means.

10. The pressure relief mechanism of claim 9, wherein said spring biasing means comprises a coil spring.

11. The pressure relief mechanism of claim 9, wherein said detent is substantially spherical.

12. The pressure relief mechanism of claim 9, wherein there are more than two detents substantially evenly spaced about said valve body.

13. The pressure relief mechanism of claim 9, wherein said valve body has adjustment means for adjusting the spring force of said spring biasing means.

14. The pressure relief mechanism of claim 13, wherein said adjustment means includes a set screw and a movable disc disposed within said valve body.

15. The pressure relief mechanism of claim 9, wherein said valve body comprises a stem portion and a flanged lip portion.

16. The pressure relief mechanism of claim 15, further comprising an O-ring disposed between said valve body flange portion and said wall of said pressurized vessel for establishing a seal therebetween independent of spring forces and internal pressures.

* * * * *